Figure 1:
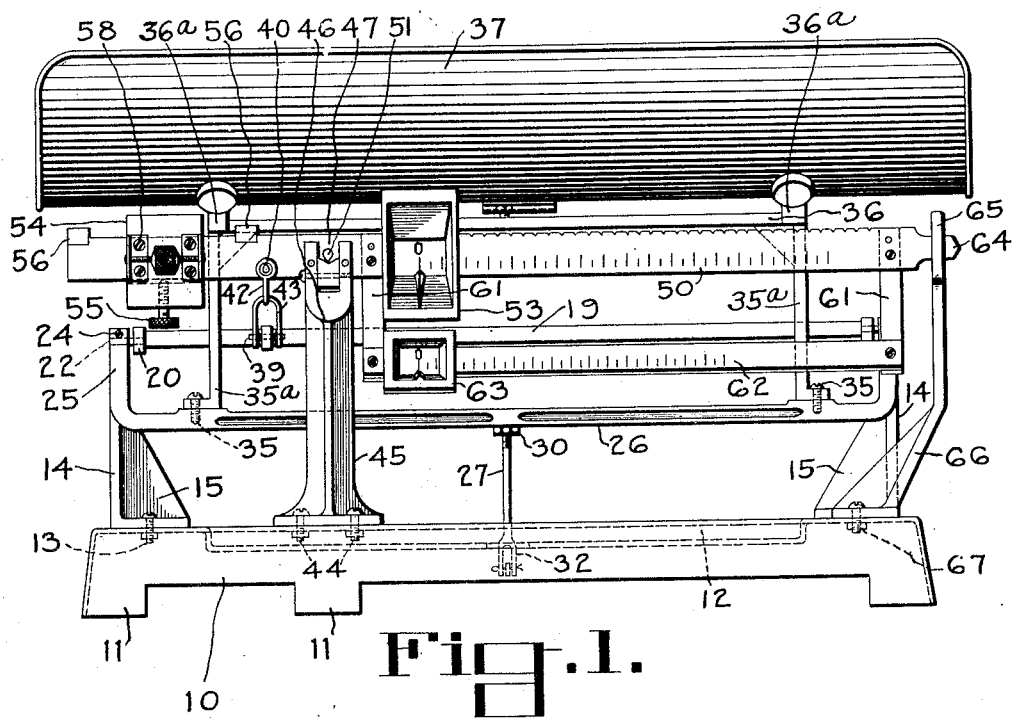

Jan. 3, 1933.  A. BOUSFIELD  1,892,718

INFANT SCALE

Filed July 31, 1929

INVENTOR
ALFRED BOUSFIELD
BY
Henry Sherman
ATTORNEY

Patented Jan. 3, 1933

1,892,718

UNITED STATES PATENT OFFICE

ALFRED BOUSFIELD, OF ST. JOHNSBURY, VERMONT, ASSIGNOR TO E. AND T. FAIRBANKS AND COMPANY, OF ST. JOHNSBURY, VERMONT, A CORPORATION OF VERMONT

INFANT SCALE

Application filed July 31, 1929. Serial No. 382,489.

This invention relates to improvements in weighing scales and more especially to weighing scales for weighing infants.

It is a general object of this invention to provide an improved scale of the class referred to whose simplicity of construction, ease of repair and replacement of parts and economies in production costs are joined with increased stability in both moving and stationary scale elements.

Another object of this invention is the elimination of counterpoise and loose weights which were always necessary in infant weighing scales as heretofore commonly constructed.

Still another object is the provision of infant weighing devices which shall be compactly constructed to occupy a relatively small amount of space and at the same time have increased stability and freedom from the danger of either the pan or the scale base tipping from the movements of the infant or carelessness in placing the latter upon the scale.

Other objects of the invention, together with certain details of construction and combinations of parts, will be described in the specification and pointed out in the appended claims.

In the drawing:—

Figure 2:
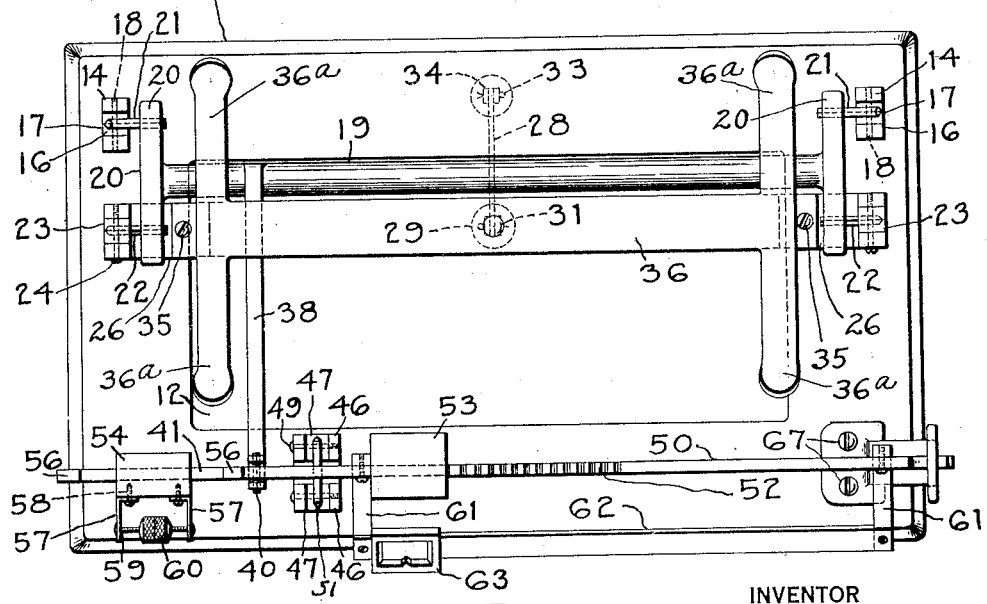

Figure 1 is a front elevation view of the scale with the weigh pan is operative position; and Figure 2 is a top plan view with the pan removed.

Similar characters of reference designate corresponding parts throughout the several views of the drawing.

Referring to the drawing wherein the preferred embodiment of my invention is shown, the reference numeral 10 designates the scale base having integral legs 11. The base may be formed of any metallic substance possessing the necessary rigidity. In the embodiment shown, the base is of pressed metal in which is formed substantially centrally thereof a rectangular depression, or recess, 12 utilized for the dual purpose of strengthening the base and providing a receptacle for pins and similar articles.

Securely fastened to base 10 by means of bolts 13 are the lever stands 14 having reinforcing ribs 15 cast integral therewith. The upper extremities of the lever stands are bifurcated to form seats 16 for the self-adjusting, or compensating, fulcrum bearings 17 journaled loosely on pins 18.

The main lever 19, which is of the pipe lever type thus eliminating the complicated system of levers normally found in scales of this type, is a casting having at its extremities transverse arms 20 cast integral therewith, in the ends of which are set the fulcrum pivots 21 and the load pivots 22. The pivots 21 are mounted on the fulcrum bearings 17.

Pivotally supported on the load pivots 22 are the self-adjusting bearings 23 journaled on screws 24 passing through the bifurcated end portions 25 of an elongated U-shaped bracket 26 having its main portion parallel to the main lever 19. The latter is rendered stable through the medium of a checking arrangement comprising a check post 27 and a check link 28. The check post extends through an aperture 29 formed in the base 10 of the scale and is adjustably fastened to the bracket, being held in adjusted position by a lock nut 30. The check link is swivelly mounted on a pin 31 in the bifurcated lower extremity 32 of the check post and also on a pin 33 in a bifurcated boss 34 fixed to the under side of the base 10.

Securely fastened to the bracket 26, as by screws 35, are two spaced, vertical posts 35a carrying an elongated frame 36 provided with upwardly curved arms 36a which are adapted to support a weigh pan 37, said weigh pan being held in position on the frame 36 by any suitable means, examples of which are well known in the art.

The main lever 19 is provided with an extension arm 38 cast integral therewith, at the free end of which is set a pivot 39 which is connected to a pivot 40 mounted in the weigh beam 41 by means of interconnected loops 42 and 43, each of said loops being provided with eyelets adapted to act as bearings for the pivots extending therethrough, as is well understood in the art.

Rigidly secured to the base in any suitable manner, as by means of bolts 44, is the beam stand 45, the upper extremity of which is bifurcated to form two arms 46, said arms being bifurcated to form seats 47 for self-adjusting bearings 48 journaled on pins 49 extending through said bifurcated arms. The main beam 50 is fulcrumed on the adjustable bearings 48 through the medium of a knife edge pivot 51 securely fixed in the beam. The main beam it notched at 52, the notches cooperating with the main poise 53 mounted for longitudinal adjustment along said beam, as is well understood in the art.

Mounted on the butt end of the main beam and adapted for sliding adjustment thereon is a balance weight 54, the purpose of which is to compensate for the weight of the blankets and clothes usually placed upon the pan before the infant is weighed. The balance weight is adapted to be held in adjusted position by a set screw 55 mounted thereon. Stops 56 cast integral with main beam 50 limit the longitudinal movement of the balance weight. Upon the balance weight is mounted brackets 57 suitably held in position thereon by screws 58. The bracket members support a screw member 59, on which is carried for adjustment longitudinally thereof an auxiliary balance weight 60 which provides a finer adjustment, as is well understood in the art. Secured in any suitable manner to the main beam 50 are the offset members 61, on which is mounted a tare beam 62 carrying tare poise 63 for sliding adjustment thereon. The main beam and the tare beam are suitably graduated. The tip end of the main beam 64 extends through a trig loop 65 formed in the upper extremity of an offset trig stand 66 rigidly secured to the base preferably by bolts 67.

Having thus described my invention, what I claim as new and desire to secure by Letters Patent of the United States is:

1. In a device of the character described, in combination, a base having lever stands fixed thereto, a lever having transverse arms fulcrumed on said stands, a weigh pan disposed above and in the same longitudinal plane as the lever and mounted on supporting means pivotally connected to said lever, and weight offsetting means connected to said lever.

2. In a device of the character described, in combination, a base having stands fixed thereto, a lever fulcrumed on said stands, a U-shaped bracket pivotally mounted on said lever and parallel thereto, a longitudinally disposed weigh pan carried by said bracket, and weight offsetting means connected to said lever.

3. In a device of the character described, in combination, a base having lever stands fixed thereto, a pipe lever fulcrumed on said stands, a bracket pivotally mounted on said pipe lever and parallel thereto, a longitudinally disposed weigh pan carried by said bracket, and weight offsetting means connected to said lever.

4. In a device of the character described, in combination, a base having lever stands fixed thereto, a pipe lever having arms extending laterally therefrom, fulcrum and load pivots disposed at the extremities of said arms, said fulcrum pivots being pivotally supported on said lever stands, a bracket pivotally mounted on said lever and parallel thereto, a weigh pan carried by said bracket, and weight offsetting means connected to said lever.

5. In a device of the character described, in combination, a base having lever stands fixed thereto, a pipe lever having arms extending laterally therefrom, fulcrum and load pivots mounted at the extremities of said arms, said fulcrum pivots being pivotally mounted on said lever stands, a U-shaped bracket pivotally supported by said pivots load and parallel to the said lever, a weigh pan carried by said bracket, and weight offsetting means connected to said lever.

6. In a device of the character described, in combination, a base having lever stands fixed thereto, a pipe lever having arms extending laterally therefrom, fulcrum and load pivots mounted at the extremities of said arms, said fulcrum pivots being pivotally mounted on said lever stands, a U-shaped bracket pivotally supported by said pivots load and parallel to the said lever, a checking means connected to said bracket, a weigh pan carried by said bracket, and weight offsetting means connected to said lever.

7. In a device of the character described, in combination, a base having a lever fulcrumed thereon, a bracket pivotally mounted on said lever having its main portion parallel to the lever and supporting a frame provided with transverse, upturned arms, a weigh pan carried by said bracket frame, a central depression in the said base disposed below the said lever and bracket, and weight offsetting means connected to said lever.

8. In a device of the character described, in combination, a base having a lever fulcrumed thereon, a bracket pivotally mounted on said lever having its main portion parallel to the lever and supporting a frame provided with transverse, upturned arms, a weigh pan carried by said bracket frame, pivotally mounted check means for the said bracket adjustably attached thereto, and weight offsetting means connected to said lever.

9. In a device of the character described, in combination, a base, a lever provided at its extremities with transversely disposed arms pivotally mounted and fulcrumed on the said base, an offset bracket having its main, base portion provided with upwardly extending posts supporting a frame and pivotally mounted on the said lever, a weigh pan carried by the said bracket frame and disposed in parallel relation to the said lever, and weight offsetting means connected to said lever.

10. In a device of the character described, in combination, a base, a lever provided at its extremities with transversely disposed arms pivotally mounted and fulcrumed on the said base, a weigh pan pivotally mounted on the said lever, and an extension lever extending laterally from the said lever and pivotally connected to a weigh beam mounted and fulcrumed on the said base in spaced longitudinal relation to the said lever.

11. In a device of the character described, in combination, a base, a lever provided at its extremities with transversely disposed arms pivotally mounted and fulcrumed on the said base, a bracket having its main, base portion provided with upwardly extending posts supporting a frame and pivotally mounted on the said lever, a weigh pan carried by the said bracket frame and disposed in parallel relation to the said lever, a weigh beam pivotally connected to the said lever and mounted on the said base in spaced longitudinal relation to the said lever, and a depending tare beam attached to the said weigh beam.

ALFRED BOUSFIELD.